US009637402B2

United States Patent
Tal et al.

(10) Patent No.: US 9,637,402 B2
(45) Date of Patent: May 2, 2017

(54) METHODS FOR THE CONVERSION OF FISH WASTE FROM AQUACULTURE SYSTEMS TO METHANE VIA A MODIFIED UASB REACTOR

(75) Inventors: Yossi Tal, St. Caesarea (IL); Kevin R. Sowers, Baltimore, MD (US)

(73) Assignee: UNIVERSITY OF MARYLAND BALTIMORE COUNTY, Baltimore, MD (US)

( * ) Notice: Subject to any disclaimer, the term of this patent is extended or adjusted under 35 U.S.C. 154(b) by 611 days.

(21) Appl. No.: 12/595,929

(22) PCT Filed: Apr. 23, 2008

(86) PCT No.: PCT/US2008/061219
§ 371 (c)(1),
(2), (4) Date: Oct. 25, 2010

(87) PCT Pub. No.: WO2008/131403
PCT Pub. Date: Oct. 30, 2008

(65) Prior Publication Data
US 2011/0039321 A1 Feb. 17, 2011

Related U.S. Application Data

(60) Provisional application No. 60/925,680, filed on Apr. 23, 2007.

(51) Int. Cl.
*A01K 63/04* (2006.01)
*C02F 3/10* (2006.01)
(Continued)

(52) U.S. Cl.
CPC .......... *C02F 3/2806* (2013.01); *C02F 3/2846* (2013.01); *C02F 11/04* (2013.01);
(Continued)

(58) Field of Classification Search
CPC ........ C02F 11/04; C02F 2103/20; C02F 3/10; C02F 3/28; C02F 3/2846; A01K 63/04; A01K 63/045; B01D 24/36
(Continued)

(56) References Cited

U.S. PATENT DOCUMENTS

| 4,316,961 A | 2/1982 | Klass et al. |
| 5,447,850 A | 9/1995 | McCann et al. |

(Continued)

FOREIGN PATENT DOCUMENTS

| JP | 2003-047996 A | 2/2003 |
| WO | 2006081359 A2 | 8/2006 |

OTHER PUBLICATIONS

Guiot et al, "Performance of an Upflow Anaerobic Reactor Combining a Sludge Blanket and a Filter Treating Sugar Waste," 1984, Dicision of Biological Sciences, National Research Council of Canada, pp. 800-806.*

(Continued)

*Primary Examiner* — Nam Nguyen
*Assistant Examiner* — Claire Norris
(74) *Attorney, Agent, or Firm* — Hultquist, PLLC; Mary B. Grant

(57) ABSTRACT

A process for treatment of sludge made up of saline organic solids or organic waste produced in a saltwater or brackish aquaculture system is described. The process includes use of a modified reactor, operating under anaerobic conditions, which yields methane from the digestion of the saline organic solids. Modification of a traditional reactor to include a packing substrate provides for saline waste digestion not previously known. Additionally provided is a process for producing methane from the digestion of organic solids. Inclusion of and use of modified reactors in aquaculture systems is also provided.

19 Claims, 2 Drawing Sheets

(51) Int. Cl.
*C02F 3/28* (2006.01)
*C02F 11/04* (2006.01)
C02F 3/00 (2006.01)
C02F 103/08 (2006.01)

(52) U.S. Cl.
CPC .......... *C02F 3/006* (2013.01); *C02F 2103/08* (2013.01); *C02F 2209/001* (2013.01); *C02F 2209/02* (2013.01); *C02F 2209/06* (2013.01); *C02F 2209/22* (2013.01); *C02F 2209/40* (2013.01); *Y02E 50/343* (2013.01)

(58) Field of Classification Search
USPC ......... 119/227, 260; 210/170.11, 747.5, 603, 210/610, 611, 612, 615, 616, 617
See application file for complete search history.

(56) References Cited

U.S. PATENT DOCUMENTS

| | | | |
|---|---|---|---|
| 6,039,874 | A | 3/2000 | Teran et al. |
| 6,443,097 | B1 | 9/2002 | Zohar |
| 6,569,332 | B2 | 5/2003 | Ainsworth et al. |
| 6,905,600 | B2 | 6/2005 | Lee |
| 7,001,519 | B2 | 2/2006 | Linden et al. |
| 7,226,539 | B2 * | 6/2007 | Dong et al. .................. 210/259 |
| 2006/0162667 | A1 | 7/2006 | Papadoylanis et al. |

OTHER PUBLICATIONS

Gebauer, "Mesophilic anaerobic treatment of sludge from saline fish farm effluents with biogas production," 2004, Bioresource Technology 93, pp. 155-167.*

Yu et al, "Biomethanation of breweery wastewater using an anaerobic upflow blanket filter," 1996, School of Civil an dStructu rla Engineering, Nanyang Technological University, pp. 219-223.*
Yu et al, "Biomethanation of brewery wastewater using an anaerobic upflow blanket filter",1996, J. Cleaner Prod. vol. 4, No. 3-4, pp. 219-223.*
Guerrero et al, "Treatment of saline wastewaters from fish meal factories in an anaerobic filter under extreme ammonia concentrations", 1997, Biosource Technology 61, pp. 69-78.*
Patel et al "Anaerobic Upflow Fixed-Film Bioreactor for Biomethanation of Salty Cheese Whey", 1999, Applied Biochemicsty and Biotechnology vol. 76, pp. 193-201.*
Braeken et al, "Regeneration of brewery waste water using nanofiltration" Water Reasearch 38, 2004, pp. 3037-3082.*
Olajare, "The brewing industry and environmental challenges" Journal of Cleaner Production xxx (2012) pp. 1-21.*
El-Shafai et al, the article "Nutrient recovery from domestic wastewater using a UASB-duckweed ponds system", Biosource Technology 98, Mar. 2007, pp. 798-807.*
Beveridge, M. C., et al., "A quantitative and qualitative assessment of west from aquatic animal production", "Aquaculture and Water Quality", 1991, pp. 506-533.
Chen, S., et al., "Sludge production and management for recirculating aquaculture system", "J. World Aquacult. Soc.", 1997, pp. 303-315, vol. 28.
Ewart, J. W. et al., "State policies for aquaculture effluents and solid wastes in northeast region", "Bulletin No. 300", 1995.
Hardy, R. W., "Fish Feeds and Nutrition", "Aquaculture Magazine", 2001, pp. 85-89, vol. 26.
Reed, S. C., et al., "Natural Systems for Waste Management and Treatment (2nd Ed.)", 1995, Publisher: McGraw-Hill, Published in: New York, NY.
Gebauer, R., "Mesophilic anaerobic treatment of sludge from saline fish farm effluents with biogas production", "Bioresource Technology", 2004, pp. 155-167, vol. 93.

* cited by examiner

METHODS FOR THE CONVERSION OF FISH WASTE FROM AQUACULTURE SYSTEMS TO METHANE VIA A MODIFIED UASB REACTOR

CROSS-REFERENCE TO RELATED APPLICATIONS

This application is a U.S. national phase under the provisions of 35 U.S.C. §371 of International Application No. PCT/US08/61219 filed Apr. 23, 2008, which in turn claims priority of U.S. Provisional Patent Application No. 60/925,680 filed Apr. 23, 2007. The disclosures of such international application and U.S. priority application are hereby incorporated herein by reference in their respective entireties, for all purposes.

FIELD OF THE INVENTION

The invention relates generally to digestion of saline sludge in recirculating marine aquaculture systems and, more specifically, to use of a modified reactor in such digestion, resulting in the production of biogas, including methane.

BACKGROUND OF THE INVENTION

In recent years the world has witnessed an alarming decline in commercial fisheries, the result of overfishing and environmental degradation. According to the Food and Agriculture Organization (FAO) of the United Nations, nearly 70% of the world's commercial marine fisheries species are now fully exploited, overexploited or depleted.

At present, the demand for seafood exceeds the supply available from fisheries. Based on anticipated population growth, it is estimated that the world's demand for seafood will double by the year 2025. Therefore, a growing seafood deficit exists between demand and supply of fisheries products. Even the most favorable estimates project that in the year 2025 the global demand for seafood will be twice as much as the commercial fisheries harvest.

The same trend is present in the U.S. Per capita consumption of seafood by Americans increased 25% from 1984 to 1994, and continues to increase. The average American in 2006 consumed 16.5 pounds of fish and shellfish. As a result, the United States has become highly dependent on imported seafood. The U.S. is, after Japan, the world's largest importer of seafood. The value of fish imports increased by nearly 80% between 1985 and 1994 to a record level of nearly $12 billion USD. This has resulted in a trade deficit of $7 billion USD for edible seafood, which is, after petroleum, the largest contributor to the U.S. trade deficit among natural products and the largest deficit among all agricultural products.

Marine fish farming is one of the world's fastest growing industries for fish production. It is very clear that the only way to meet the world's growing needs in fisheries products, and to reverse the U.S. fisheries trade deficit, is through marine aquaculture systems—the farming of aquatic organisms in controlled environments. In response to the situation, global aquaculture production is expanding quickly. Aquaculture's contribution to the world's seafood supplies increased from 12% to 19% between 1984 and 1994. U.S. aquaculture production has also grown steadily in the 1980s and 1990s and it is the fastest growing agricultural industry. However, despite the recent growth of the U.S. industry, only 10% of the seafood consumed in the U.S. comes from domestic aquaculture and the U.S. ranks only tenth in the world in the value of its aquaculture production.

Worldwide, it is estimated that in order to close the increasing gap between demand and supplies of fish products, aquaculture will need to increase production three-to-four-fold during the next two and a half decades. In this context, there is a compelling motivation to develop aquaculture systems of improved and commercially viable character for high volume production of fish and environmental sustainability.

A major drawback of this industry is its negative impact on the marine environment in the form of organic/inorganic pollution of coastal areas by decomposition of fish feces and uneaten food. In response to this concern there is a trend to shift marine fish farming inland using closed recirculating systems in order to reduce its environmental impact. Such systems conserve water, allow treatment of polluted water within a closed loop and offer improved control of effluent discharge, thereby reducing the environmental impact of the system.

Most of the closed recirculating aquaculture systems include biological nitrogen removal through nitrification/denitrification process and mechanical solids removal. In the U.S., strict new regulations on organic matter discharge have motivated the aquaculture industry to integrate solid waste treatment as part of its operation. Such treatment employs flocculation/coagulation processes to reduce sludge volume prior to composting it for land dispersal. However, the high salinity of marine and brackish water sludge limits its use as fertilizers and is a source of pollution in landfills and waste outflows.

The output from recirculating aquaculture systems is primarily organic, composed of suspended matter originating from uneaten feed and fish fecal material. It is estimated that 30% to 40% (w/w) of the fish feed will end up as organic waste (Beveridge, M. C., Phillips, M. J., Clark, R. M., 1991, *A quantitative and qualitative assessment of west from aquatic animal production*; in D. E. Burne and J. R. Tomasso (Eds.), *Aquaculture and water quality* (pp. 506-533)). An aquaculture facility with a standing fish crop of 100 tons and a daily feeding rate of 2% of fish body weight will produce annually 220-290 tons of dry organic waste as total suspended solids (TSS). The actual volume of the collected waste after settling is 10 times higher and can reach a volume of 2200-2900 $m^3$. It has been calculated that a 100 ton salmon farm releases an amount of nitrogen, phosphorus and fecal matter roughly equivalent to the nutrient waste in untreated sewage from 20,000, 25,000 and 65,000 people, respectively (Hardy, R. W. 2001. *Aquaculture Magazine* 26: 85-89).

The two most common methods used to recycle solid wastes from aquaculture facilities are land application and composting (Ewart, J. W., Hankins, J, A., Bullock, D. 1995, *State policies for aquaculture effluents and solid wastes in the northeast region*. Bulletin No. 300). Depending on an aquaculture facility's location and the local regulations, an aquaculture facility may have only limited, costly options available for sludge disposal. Ewart et al. showed that land application of manure and other organic wastes (including wastewater) to fertilize agricultural crops is governed in most states in the USA by regulations that limit the amount of heavy metals, pathogens, and other contaminants and the land application rates. In particular, application rates are based upon nutrient content, soil type, and plant nutrient uptake characteristics to prevent runoff or groundwater contamination or salting (Chen, S., Coffin, D. E., Malone, R. F. 1997. *Sludge production and management for recirculat-* ing aquaculture system. *J. World Aquacult. Soc.* 28: 303-315; Ewart et al.). Odor problems can also limit land application in populated areas. Sludge transport from the facility to another point of disposal or reuse is a major factor in the costs of sludge management because the thickened sludge is greater than 90% water (Black and Veatch, L.L.P. 1995. *Wastewater Biosolids and Water Residuals: Reference Manual on Conditioning, Thickening, Dewatering, and Drying.* CEC Report CR-105603. The Electric Power Research Institute, Community Environment Center, Washington University, St. Louis, Mo.; Reed, S. C., Crites, R. W., Middlebrooks, E. J. 1995. *Natural Systems for Waste Management and Treatment,* 2nd ed. McGraw-Hill, New York.).

The problem of sludge disposal from saltwater aquaculture facilities is even more challenging. The high salt concentrations prevent the use of marine sludge for land application or composting, the two most common methods for sludge disposal from fresh water aquaculture systems. It is expected that a future shift of net-pen mariculture operations to inland recirculating aquaculture systems will produce high amounts of salted sludge that need to be treated. Not addressing this problem in the present can result in a future "bottle neck" effect that will prevent the potential growth of marine fish production in inland recirculating systems.

Thus, a need exists for treatment of sludge from saltwater aquaculture systems and for improved recirculating aquaculture systems integrating such sludge treatment, which will result in a high yield of quality fish species with low environmental impact. The present invention satisfies this need and provides additional advantages.

SUMMARY OF THE INVENTION

The present invention relates generally to digestion of saline sludge in recirculating marine aquaculture systems in order to produce high yield, high quality fish species with low environmental impact.

In one aspect the invention provides a method of digesting saline organic solids produced in an aquaculture system comprising use of an anaerobic reactor to produce methane.

In another aspect the invention provides a method for producing methane gas comprising digestion of saline organic solids produced by an aquaculture system.

In still another aspect the invention provides a closed, recirculating marine aquaculture process system for production of a marine fish species comprising operation in an aqueous medium and further comprising removal of saline organic solids from the aqueous medium using an anaerobic reactor to produce methane.

In yet another aspect the invention provides for use of a modified UASB reactor in a closed, recirculating marine aquaculture process for production of a marine fish species wherein the UASB reactor includes a packing material that comprises a material with a composition suitable for the deposit of microbial biofilms and which has a high surface area to volume ratio.

In another aspect the invention provides an upflow anaerobic digestion methane generation system, comprising an upflow reactor including: an inlet at a lower portion of the reactor and an outlet at an upper portion of the reactor, a saline medium in the reactor containing a bed of sludge solids in a lower portion thereof, and a plurality of support bodies in the reactor having methanogenic biofilms thereon, with a gas recovery assembly adapted to recover methane-containing gas generated by said methanogenic biofilms as a result of anaerobic digestion of said sludge solids.

DETAILED DESCRIPTION OF THE INVENTION

Figure 1:
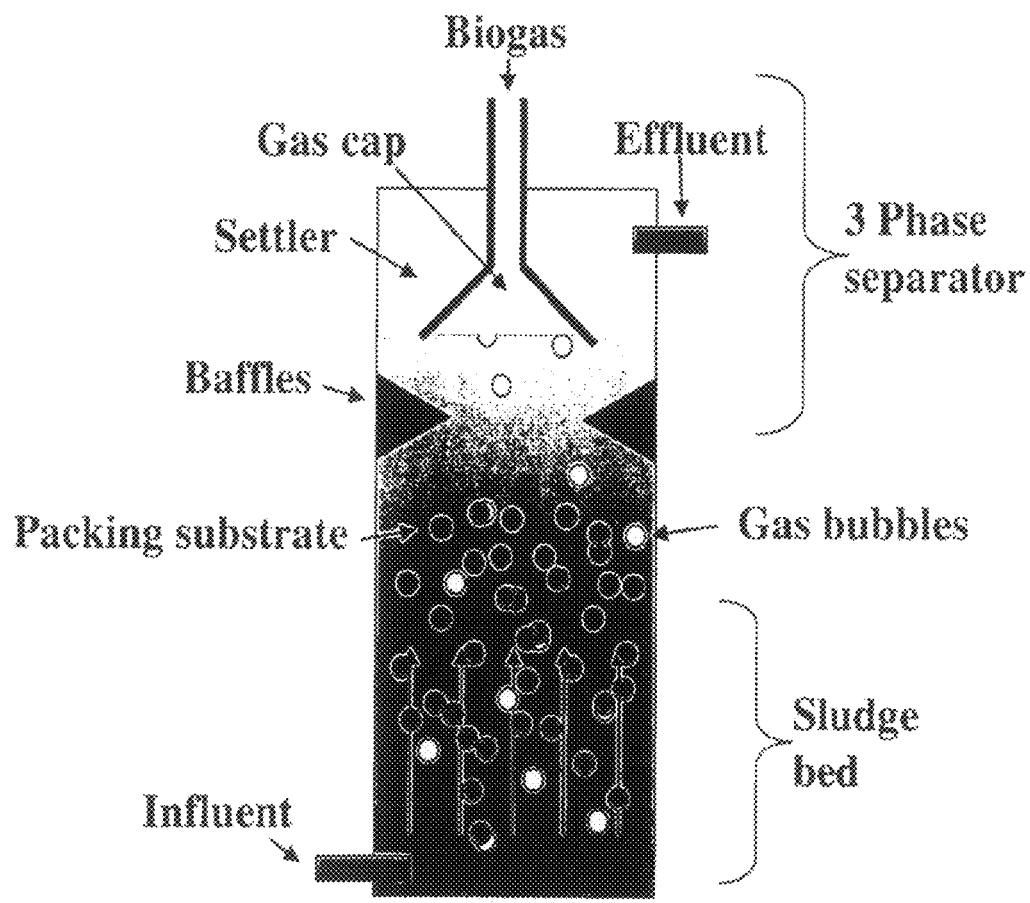
FIG. 1 provides a model of an exemplary modified upflow anaerobic sludge blanket (UASB) reactor utilized in the method of the invention.

The present invention relates to a method of treatment of saline-containing sludge generated by a marine aquaculture system. The present invention also relates to generation of methane by digestion of saline-containing sludge. Further, the present invention relates to an anaerobic reactor for the digestion of saline-containing sludge from marine aquaculture systems and the production of methane gas. The present invention also relates to use of the reactor in a recirculating marine aquaculture system.

In general, a marine aquaculture system is a system used in the cultivation of marine organisms, e.g. fish. Such cultivation is performed under controlled conditions to maximize the desired output. In the case of fish farming using such a system, the desired output is optionally measured as a measure of fish weight per volume of the aquaculture medium. Particularly desirable are systems resulting in high density yield of fish.

An exemplary marine aquaculture system with varying characteristics, such as light exposure regimens, salinity, temperature, pH, etc. is provided in U.S. Pat. No. 6,443,097. Use of such aquaculture systems, as a result of its low waste production characteristics and its amenability to use of municipal water as a source of aqueous media for marine aquaculture processing, permits commercial fish-farming operations to be conducted in urban environments and similar locations where deployment of aquaculture production facilities had not been commercially practicable prior to development of such systems.

Aquaculture systems are broadly applicable to aquaculture production of a wide variety of marine species, including, but not limited to gilthead seabream (*Sparus aurata*), haddock, reedfish (*Calamoichthys calabaricus*), sturgeon (*Acipenser transmontanus*), snook (*Centropomus undecimalis*), black sea bass (*Centropristis striata*), masu salmon, Atlantic salmon, rainbow trout, monkfish, sole, perch, tilapia, flounder, mahi mahi, striped bass, shad, pike, whitefish, swordfish, red snapper, barramundi, turbot, red drum, and the like.

A recirculated aquaculture system, while amenable to embodiment in various specific forms, typically comprises an assembly of tanks each containing an aqueous medium for a specific stage of the aquaculture process (broodstock conditioning, spawning, egg incubation, larval rearing, nursery rearing, and grow-out), with ancillary solids removal filters, biofilters having associated active microbial communities, oxygen (or oxygen-containing gas) sources, and automatic control unit(s) for monitoring and control of oxygen, salinity, temperature, photoexposure, pH and carbon dioxide in respective tanks of the aquaculture process system. The aquaculture process system may also include optional ancillary facilities, such as ozonation/disinfection units, foam fractionation (foam breaker or defoaming) units, brine generator units, automatic feeder units, biopsy facilities, harvesting/packaging facilities, etc.

A recirculated marine aquaculture process system may be housed in a dedicated building or other structure. The ability of the process to utilize municipal water permits the aquaculture system to be sited in urban or suburban areas, where transportation and infrastructure costs for support of the facility are significantly lower than in other areas traditionally considered for fish-farming operations.

The tanks that are used to contain the aqueous medium in carrying out the process of the invention may be of any suitable type, preferably being constructed of a corrosion-resistant material. The tanks may be covered to retard evaporation, or uncovered, as necessary or desirable in a given application of the invention.

The salinity of the aqueous medium in the tanks may be adjusted to the proper level using an electrochemical monitoring device such as a salinity probe and associated controls, or other of various suitable means known in the art for maintaining salinity at a desired value or within a predetermined operating range.

The tanks may be coupled to a suitable power supply, as necessary to power lighting systems and the like. The power supply associated with the lighting system in turn may be coupled to a monitoring and control module for the aquaculture system. Such monitoring and control module may be arranged to variably control the light to which the contents of the tank are exposed, specifically regulating the light intensity and the length of the photoperiod (the period of light exposure).

The monitoring and control module may also or alternatively be arranged to monitor and control other parameters of system operation, such as the water (aqueous medium) temperature, dissolved oxygen (DO) content of the water, pH of the water, feed (nutrient) dispensing, green water algal conditions, salinity, water flow rates into and out of the tank, etc., by appropriate coupling of the module with monitoring and control elements such as dissolved oxygen probes, thermocouples, pH sensors, flow monitors, flow control valves, salinity detectors, oxygen feed devices, acid/base dispensers, automated food dispensers, etc.

In operation of the aquaculture process system, aqueous medium may be pumped from the aquaculture tank by a system pump in a recirculation loop or flow circuit, for treatment outside the tank. For example, aqueous medium may be flowed from the tank to a filtration unit, such as a bead filter tank, in which suspended solids in the water are trapped by bead filtration media and removed from the aqueous medium.

Such filtration unit may for example be arranged to remove particulates having a particle size>20 microns. The bead filter is advantageously provided with electronic controls to effect periodic backflushing of the filter, e.g., cycle timer controls for backflushing at predetermined intervals, solids monitoring devices such as turbidity sensors, and/or other automated control means, the provision of which is within the skill of the applicable art.

The filtration unit removes sediment, and may have associated therewith a protein skimmer, to remove proteinaceous material floating to the top of the filtration tank.

In lieu of, or in addition to, bead filters, numerous other types of mechanical filters can be employed for solids removal, such as membrane filters, sedimentation chambers, clarifiers, centrifugal solids separators, filter presses, etc.

Upon completion of mechanical filtration, filtered water (filtrate) from the mechanical filter then may be flowed to a moving bed biofilter for nitrification under aerobic conditions, so that the ammonia ($NH_3$) or $NH_4^+$ present in the aqueous medium is converted to $NO_2$ and then to $NO_3$), with optional subsequent denitrification in a denitrification biofilter under anaerobic conditions. After optional denitrification, the aqueous medium can be re-oxygenated to provide a suitable level of dissolved oxygen therein, e.g., a concentration of at least 3 ppm, and preferably 3-7 ppm. The resultant treated water is recirculated to the aquaculture tank.

In the recirculation loop, water discharged from the filter can be selectively heated or cooled as necessary to maintain the aquaculture medium at a given temperature in the associated aquaculture tank. For example, such aqueous medium may be flowed to a heat exchanger, such as a shell-and-tube heat exchanger, in which the circulated aqueous medium is heated or cooled, as appropriate, by a heat exchange liquid, e.g., a glycol/water solution. The heat exchange liquid may be circulated through the passages of the heat exchanger from a source vessel, in which the liquid is maintained at a desired temperature, as necessary for the desired heat exchange heating or cooling of the aqueous medium.

In such manner, the water in the aquaculture tank can be maintained at a desired temperature appropriate to the specific fish species being grown in the process system.

In the recirculation flow circuit, a side stream loop may advantageously be provided, including a pump that is operated to flow the aqueous medium through a treatment unit in which dissolved organic species are removed by contact with ozone or oxygen. Such treatment unit optionally may be equipped with a protein skimmer, to remove floating proteinaceous matter from the surface of the liquid in the associated treatment unit tank(s). The treated water then may be flowed through a polishing chamber arranged for ion exchange, pH adjustment, and/or other treatment of the recycled aqueous medium, prior to its return to the aquaculture tank.

Overflow from any of the filters or tanks as well as waste solids from the filters in the aquaculture process system may be flowed to a waste tank where water and solids are treated with a disinfecting agent, such as chlorine or the like. The disinfected overflow/solids then may be discharged from the aquaculture system, e.g., into a municipal sewage system, aeration pond, or other receiving waters, for final disposition.

Operation of marine aquaculture systems described herein results in production of waste. As used herein, the terms "organic solids" and "organic waste" are interchangeable. Such waste may include solid matter or liquid waste within the aqueous environment of the aquaculture system. The waste may be made up of any or all of the following: saline organic solids, fish feed, fish fecal matter and fish parts, including carcasses, scales, skin or viscera. Waste in a marine aquaculture system is therefore made up of organic solids that pollute the system. Where the marine aquaculture system comprises saltwater the waste will also include salt, such that the organic solids are saline organic solids.

In an embodiment of the present invention, the waste may be degraded by use of an anaerobic reactor described herein. Such reactor may be integrated within the aquaculture system. The term "anaerobic" as used herein is used to refer to the degradation of waste in the absence of oxygen.

One type of reactor utilized in removal of organic waste from a freshwater aquaculture system is an upflow anaerobic sludge blanket (UASB). A UASB may be utilized within a freshwater aquaculture system for anaerobic treatment of the waste-containing aqueous medium contained therein. A traditional UASB reactor includes an inlet to allow entry of the waste-containing aqueous medium into the reactor. Sludge is formed from granules of waste that have formed into large microbial aggregates with a high sedimentation velocity and thus settle to the bottom of the reactor and resist washout from the system. As the sludge builds up and additional waste-containing aqueous medium is provided to the reactor, reaction of the microorganisms and substrates of the aqueous medium results in anaerobic degradation of the sludge and production of biogas containing carbon dioxide and methane. The reaction can be summarized as follows:

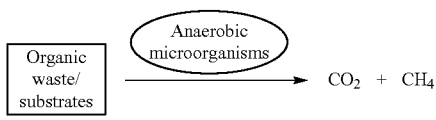

Due to the presence of saline in a marine aquaculture environment, a traditional UASB reactor lacks effectiveness in degradation of saline-containing sludge built up in a saltwater aquaculture system. The present invention, however, provides a modified UASB which is effective in generating anaerobic degradation of saline-rich organic solids. An exemplary modified UASB of the invention is shown in FIG. 1.

The modified UASB reactor of the invention includes an inlet for ingress of the waste-containing aqueous medium, and contains a bottom layer of sludge packed into a "sludge bed," a sludge blanket covered with packing substrate and an upper liquid layer, as shown in FIG. 1. Near the top of the reactor, baffles are provided to direct any biogas generated by anaerobic degradation of the sludge to the gas cap and out of the top of the vessel. Settler screen(s) are provided to separate the sludge from the treated aqueous medium and an outlet is provided for egress of the treated aqueous medium.

In the modified UASB reactor described herein, the "packing substrate," also referred to as a "packing material" is used to immobilize the organic solids. The packing material present in the modified reactor preferably comprises a material with a high surface-to-volume ratio. The packing material serves as a substrate for formation of microbial biofilms comprising a methanogenic consortium of microorganisms (fermenters, acetogens and methanogens) and improves the methane production by the consortium by providing a high surface area.

In an exemplary embodiment, salt marine water with solids concentration of 3%-4% is fed into the modified reactor from the inlet, and flows upward through the sludge bed and packing bed that is covered by an active bacterial mat. Settler screens separate the sludge from the treated water and biogas is collected at the top of the vessel.

The modified UASB reactor described herein differs from a standard UASB reactor in the formation of biofilms on the packing substrate, as described above, rather than immobilization of sludge by formation of large microbial aggregates into distinct granules, as occurs in a standard reactor.

While the anaerobic digestion of recovered solids from wastewater is a common unit operation in municipal wastewater treatment systems, and although anaerobic sludge solids digestion is known for methane generation, anaerobic digestion has heretofore been considered inapplicable to marine water or other water characterized by high salinity levels due to the adverse effect of salt on conventional microbial flora used for freshwater-based anaerobic digestion.

It therefore was surprising and unexpected that saline sludge in saline or marine water could be utilized for microbially-mediated anaerobic digestion without adverse effect on the microbial species. This discovery has been implemented in a highly efficient manner, using methanogenic microorganisms in biofilms on support bodies that are contained in the reactor. The support bodies may be of any suitable type, size and shape, and may for example comprise bodies formed of plastic or polymeric materials on which biofilms of the desired methanogenic microorganisms can grow.

The process conditions for induction of biofilm formation on the support structure are readily determinable, within the skill of the art, by the simple expedient of conducting sequential runs with variation of process conditions in the reactor (temperature, pressure, flow rate, residence time, etc.) to determine the process envelope of conditions that is appropriate for biofilm formation in the reactor associated with the aquaculture system.

Therefore the present invention provides a highly efficient method of digesting saline organic solids in an aquaculture system by using the above-described modified UASB reactor.

In another embodiment, the invention provides for production of methane from saline sludge formed from saline organic solids utilizing a modified UASB reactor as described above. Saline waste-containing aqueous medium is fed into the modified reactor from the influent and flows upward through the sludge bed and packing substrate. The organic solids within the aqueous medium affix to the packing substrate and form microbial biofilms with maximized surface area allowing for reaction with additional substrates, resulting in generation of methane.

In still another embodiment, the invention provides for a marine recirculating aquaculture process system with a modified UASB reactor as described above integrated therein. In yet another embodiment, the invention provides for use of a modified UASB reactor as described above in an aquaculture system.

In yet another embodiment, the invention provides an upflow anaerobic digestion generation system, including an upflow reactor as described herein. In a preferred embodiment, the reactor would include an inlet at a lower portion of the reactor and an outlet at an upper portion of the reactor. The reactor would also preferably contain a saline medium and a bed of sludge solids in a lower portion. Additionally, within the reactor would be a plurality of support bodies having methanogenic biofilms thereon. The system would include a gas recovery assembly adapted to recover methane-containing gas generated by said methanogenic biofilms as a result of anaerobic digestion of said sludge solids.

Any source of filtered fresh water may be used to supply fresh (or make-up) water for the aquaculture process, such as well water, or alternatively river water after appropriate sterilization. If the fresh water source is chlorinated municipal water, the water desirably is first treated to remove chlorine therefrom, e.g., by passage through a multi-sand medium and then activated carbon.

The aquaculture process facility may include fresh water and salt water storage for the aqueous medium used in the process. Salt water may be produced in the aquaculture facility using a brine generator, with trace mineral introduction and saltwater mixing in a mixing chamber, e.g., to form a saline aqueous medium at the salinity of natural seawater, or higher. The resultant saline aqueous medium then can be used in the process, at full strength or in diluted (hyposaline) form, as may be variously desired in the respective steps of the aquaculture process.

The aquaculture system may comprise appropriate flow circuitry in the form of pipes, conduits, manifolds, flow control valves, restricted flow orifice elements, valve actuators and controllers (which may be of any appropriate type, including elements such as pneumatic actuators, electromechanical actuators, solenoid valves, etc.) and the flow circuitry may include or be operatively coupled to a central controller unit or assembly.

In operation, the aqueous medium from the aquaculture tank preferably is circulated in a closed recirculation loop to an aqueous medium treatment complex (e.g., comprised of equipment such as bead filters, biofilters, ozonation units, protein skimmers, etc.) and recirculated to the aquaculture tank after treatment in the exterior recirculation loop.

In this manner, the process system is advantageously arranged to provide a desired volumetric turn-over frequency of the aqueous medium in the operation of the system, with flow from the aquaculture tank through the associated liquid recirculation loop and back to the aquaculture tank, with waste removal and make-up water addition as required. By appropriate arrangement of the recirculation loop and component pump(s), an appropriate turn-over rate of the aquaculture tank liquid volume may be effected for the specific operation being carried out in such tank. For example, the process can be operated to replenish the entire volume of water in the aquaculture tanks at a rate in a range of from about 1.5 to about 5 times an hour, e.g., 2 to 4 times an hour, or 3 to 4 times an hour, as may be desired in various illustrative embodiments.

The liquid recirculation loop associated with the aquaculture tank desirably includes a biofilter, preferably containing microbial support media in a moving bed filter that is maintained in suspension in the tank liquid. Liquid circulation in the biofilter may be effected by diffusing air through a porous element, such as a rubber disk membrane, to cause the microbial support media to tumble and mix. The injection of gas and resultant gas-induced mixing provides increased contact between the microbial communities in the biofilter and the various dissolved metabolites. This in turn increases the cleansing action of the biofilter in treating the large volumes of water that are recirculated in the aquaculture system to achieve high efficiency operation.

Each aquaculture tank in the aquaculture process system preferably is computer monitored to control temperature, pH, dissolved oxygen, salinity, flow rates, light intensity and length of photoperiod at specific preferred optimal values or in specific optimal ranges, as appropriate to the particular aquaculture process and fish species involved. In the biofilters, monitoring advantageously is carried out to maintain microbial flora on the biofilter substrate elements in populations appropriate to high-rate purification of the aqueous medium in the high flow rate recirculation loop.

For such purpose, appropriate sensing, monitoring and control elements may be interconnected with a CPU or other computer or automatic controller/monitoring unit, to provide an integrated monitoring and control module, e.g., for monitoring and controlling process parameters such as flow rates, photoexposure, dissolved oxygen concentration, temperature, pH, etc., and/or for effecting process operations, such as backwashing of system filters, filling/emptying of process tanks, dispensing of feed/nutrient material, actuating heating/cooling systems, etc.

In the entire aquaculture process, electronic controls may be employed for back-flushing filters, for monitoring and controlling flow rates, dissolved oxygen concentration, temperature, pH, etc., using a microprocessor or computer system. Waste comprising overflow and solids sedimented or backwashed from the filters may be processed by disinfection and final discharge to sewer or other disposition or treatment, as previously described.

In optimal operation, the aquaculture process of the invention is conducted with less than 10% daily water exchange (daily water exchange meaning the water that is introduced to the aquaculture system as net make-up, and the water that is discharged from the system as net effluent to the waste disposal system). The aquaculture process system in such respect is a "closed" recirculating aquaculture system, since the net exchange of water with the external environment during normal operation of the system is extremely low. Such low level of net water consumption is enabled by the recirculated and continuously purified character of the water. The net waste generation is minimized, and net waste produced in the operation of the facility can be readily accommodated by local sewer, septic and wastewater treatment facilities.

The following example is intended to illustrate, but not limit the invention.

Example 1

Recirculating Marine Aquaculture System with Integrated Modified UASB Reactor

This invention demonstrates a method of digesting saline organic solids, resulting in production of methane gas. As such, the invention also demonstrates a method for producing methane gas. Furthermore the invention demonstrates an aquaculture process utilizing such a modified reactor.

Figure 2:
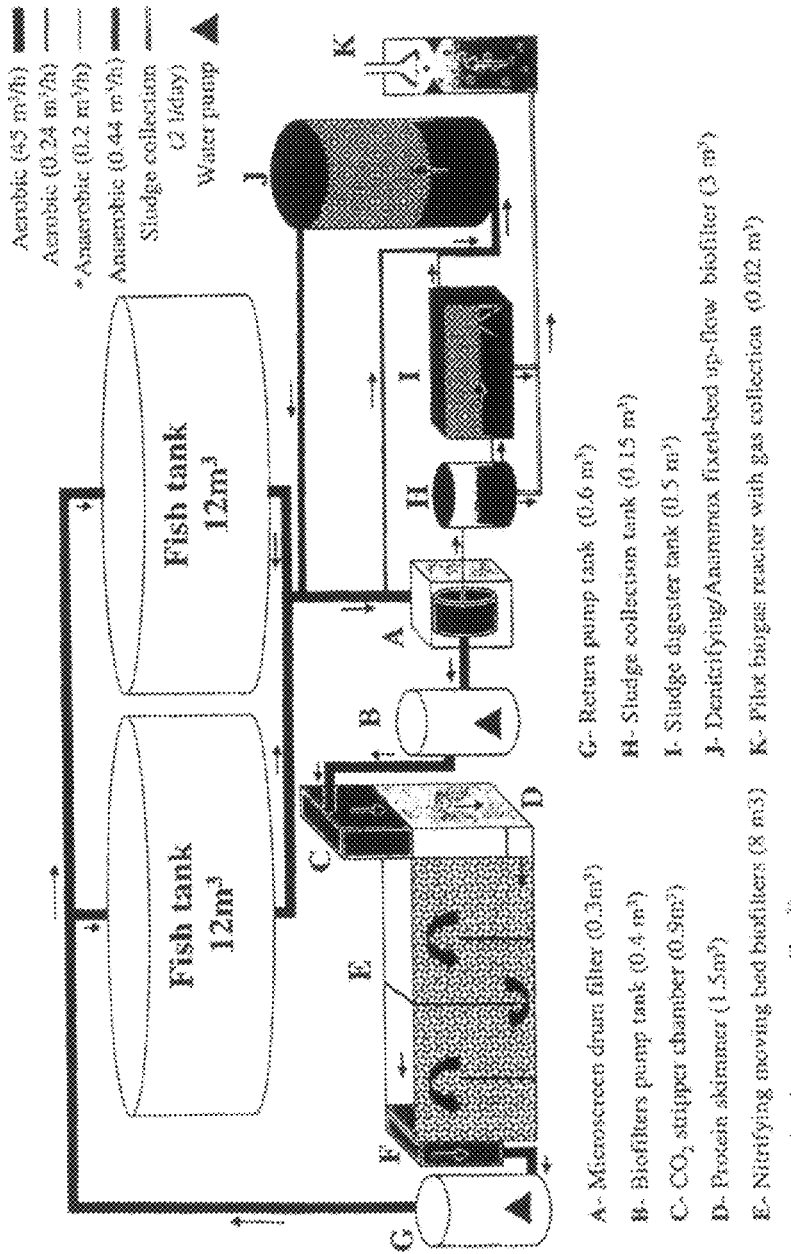
FIG. 2 illustrates a preferred configuration of a recirculating aquaculture system with integrated modified UASB reactor for methane production as part of its anaerobic water treatment loop in a method of the invention.

The modified UASB reactor described herein was integrated into a novel marine recirculating aquaculture system as part of its anaerobic water and solids treatment loop, as shown in FIG. 2. The performances of the reactor in terms of sludge digestion and methane production efficiencies were evaluated during 130 days of the fish growth cycle. The modified UASB reactor demonstrated a stable production of biogas during the whole 130 day run. Moreover, the biogas composition analysis showed high concentration of methane (more than 50%) indicating very efficient methanogenic activity in the reactor. Sludge digestibility parameters showed more than 80% digestion of the organic solids fed to the UASB reactor.

Although the invention has been described with reference to the above examples, it will be understood that modifications and variations are encompassed within the spirit and scope of the invention. Accordingly, the invention is limited only by the following claims.

What is claimed is:

1. A method of digesting saline organic solids produced in an aquaculture system, the method comprising the steps of:
   a) receiving a saline medium having the salinity of natural seawater or higher into a modified upflow anaerobic sludge blanket (UASB) reactor, the medium comprising organic solids generated by a marine aquaculture system and the UASB reactor comprising a biofilm on a packing material, the biofilm comprising a methanogenic consortium of microorganisms, wherein the organic solids affix to the packing material and form further microbial biofilms without formation of microbial aggregates into granules in the UASB reactor; and b) processing the saline medium in the UASB reactor such that the solids are degraded and methane is produced.

2. The method of claim 1, wherein the aquaculture system is a saline marine aquaculture system for marine fish.

3. A method of producing methane comprising anaerobically digesting saline organic solids produced in an aquaculture system, the method comprising the steps of:
a) receiving a saline medium having the salinity of natural seawater or higher into a modified upflow anaerobic sludge blanket (UASB) reactor, the medium comprising organic solids generated by a marine aquaculture system and the UASB reactor comprising a biofilm on a packing material, the biofilm comprising a methanogenic consortium of microorganisms, wherein the organic solids affix to the packing material and form further microbial biofilms without formation of microbial aggregates into granules in the UASB reactor; and
b) processing the saline medium in the UASB reactor such that the solids are degraded and methane is produced.

4. The method according to claim 3, wherein the aquaculture system is a saline marine aquaculture system for marine fish.

5. The method of claim 3, wherein the aquaculture system comprises a closed, recirculating marine aquaculture system for production of a marine fish species.

6. The method of claim 5, wherein the aquaculture system is a saline marine aquaculture system for the marine fish species.

7. The method of claim 1, wherein the microorganisms of the methanogenic consortium are selected from the group consisting of fermenters, acetogens and methanogens.

8. The method of claim 1, wherein the aquaculture system comprises a recirculating marine system for the production of a marine fish species.

9. The method of claim 1, wherein the organic solids comprise any of saline organic solids, fish feed, fish fecal matter, and fish parts.

10. The method of claim 3, wherein the microorganisms of the methanogenic consortium are selected from the group consisting of fermenters, acetogens and methanogens.

11. The method of claim 3, wherein the organic solids comprise any of saline organic solids, fish feed, fish fecal matter, and fish parts.

12. A method of digesting saline organic solids produced in an aquaculture system, the method comprising the steps of:
a) flowing an aqueous medium having the salinity of natural seawater or higher containing saline organic solids from the aquaculture system to a filtration unit;
b) removing the saline organic solids from the aqueous medium in the filtration unit, forming an aqueous filtrate;
c) receiving the saline organic solids into a modified upflow anaerobic sludge blanket (UASB) reactor, the UASB reactor comprising a biofilm on a packing material, the biofilm comprising a methanogenic consortium of microorganisms, said biofilm being formed without formation of microbial aggregates into granules in the UASB reactor; and
d) processing the saline organic solids in the UASB reactor such that the solids are degraded and methane is produced.

13. The method of claim 12, wherein the microorganisms of the methanogenic consortium are selected from the group consisting of fermenters, acetogens and methanogens.

14. The method of claim 12, wherein the aquaculture system comprises a recirculating marine system for the production of a marine fish species.

15. The method of claim 12, wherein the organic solids comprise any of saline organic solids, fish feed, fish fecal matter, and fish parts.

16. The method of claim 12, wherein the filtration unit removes particulates having a particle size greater than 20 microns.

17. The method of claim 12, wherein the filtration unit comprises a bead filter tank, wherein suspended saline organic solids in the aqueous medium are trapped by bead filtration media and removed therefrom.

18. The method of claim 12, further comprising flowing the aqueous filtrate to a moving bed biofilter for nitrification under aerobic conditions.

19. A method of digesting saline organic solids produced in an aquaculture system, the method comprising the steps of:
a) receiving a hyposaline medium into a modified upflow anaerobic sludge blanket (UASB) reactor, the hyposaline medium comprising organic solids generated by a saline marine aquaculture system and the UASB reactor comprising a biofilm on a packing material, the biofilm comprising a methanogenic consortium of microorganisms, wherein the organic solids affix to the packing material and form further microbial biofilms without formation of microbial aggregates into granules in the UASB reactor; and
b) processing the hyposaline medium in the UASB reactor such that the solids are degraded and methane is produced.

* * * * *